S. D. KINNE.
WEIGHING MACHINE.
APPLICATION FILED OCT. 26, 1903.
1,074,123.
Patented Sept. 30, 1913.
3 SHEETS—SHEET 1.
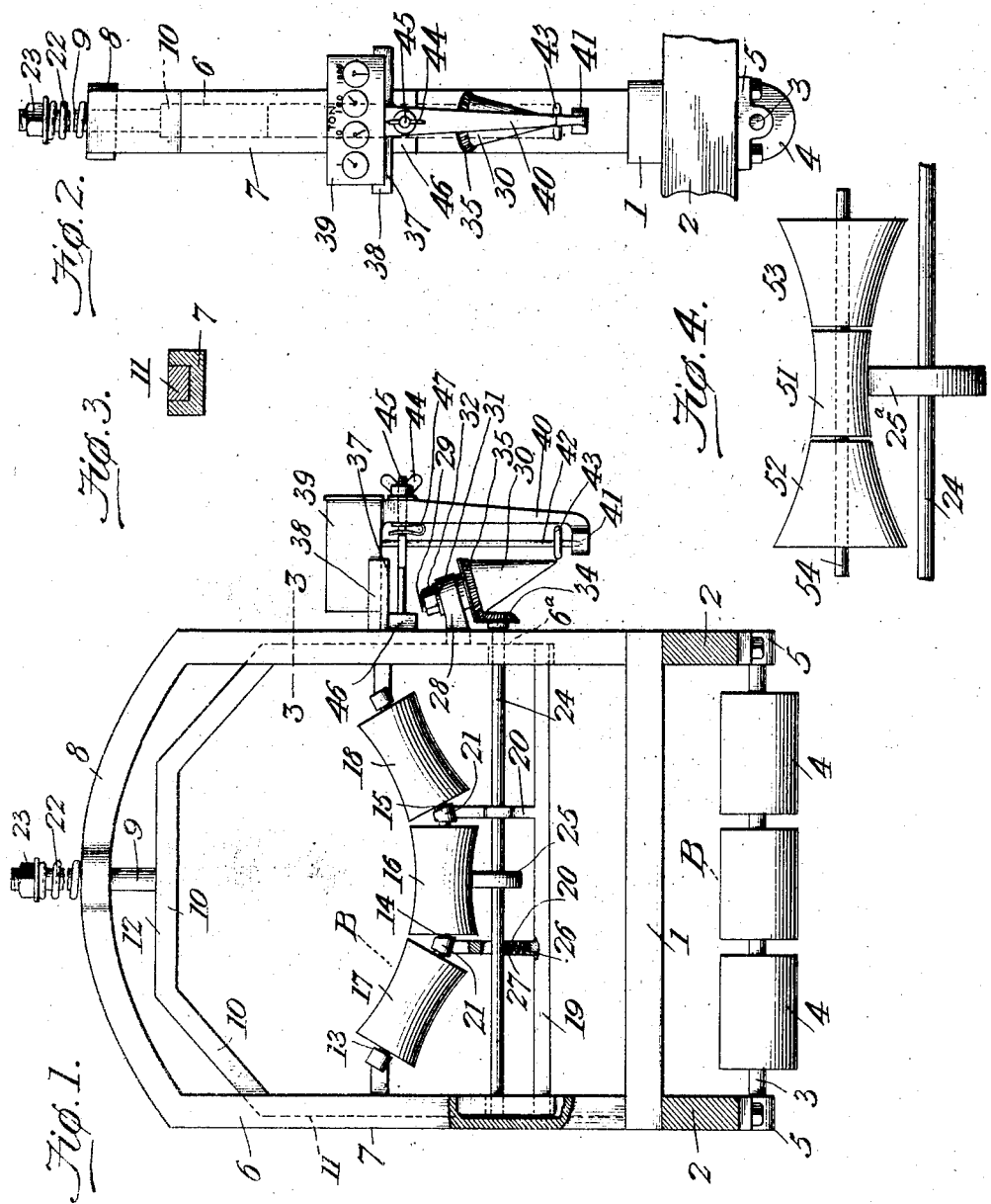
Witnesses
N. Goodspeed
T. Kearns
Inventor
Samuel D. Kinne
by Howard A. Coombs
his attorney S. D. KINNE.
WEIGHING MACHINE.
APPLICATION FILED OCT. 28, 1903.
1,074,123.
Patented Sept. 30, 1913.
3 SHEETS—SHEET 2.
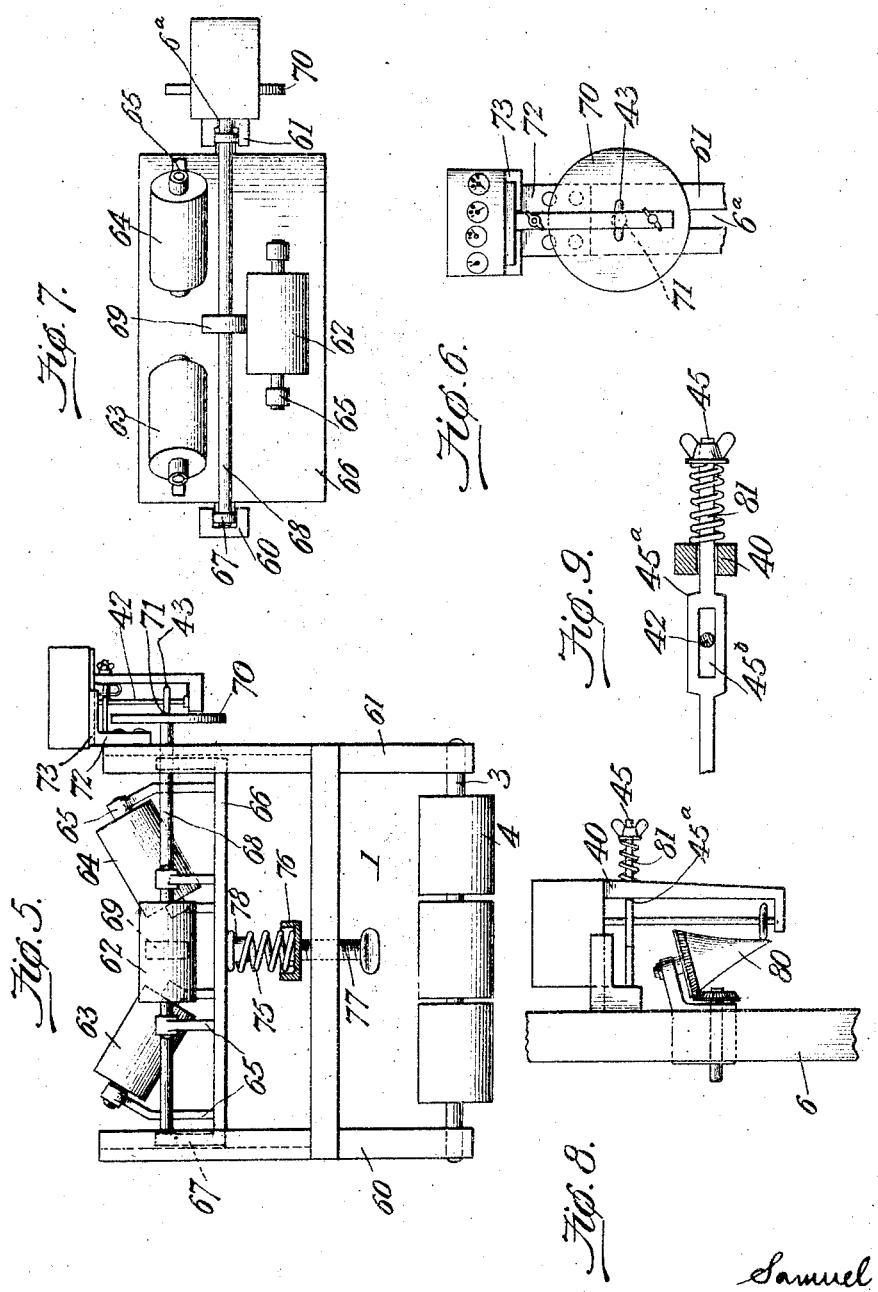
Witnesses
Inventor
Samuel D Kinne
by Howard A Coombe
his attorney S. D. KINNE.
WEIGHING MACHINE.
APPLICATION FILED OCT. 28, 1903.
1,074,123.
Patented Sept. 30, 1913.
3 SHEETS—SHEET 3.
Fig. 10.
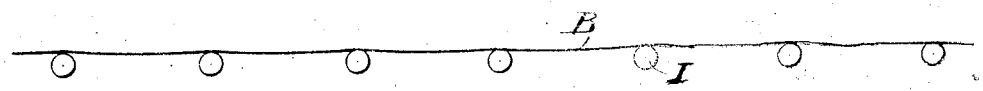
Fig. 11.
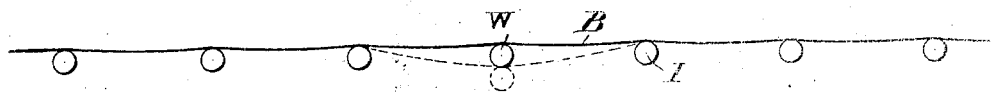
Fig. 12.
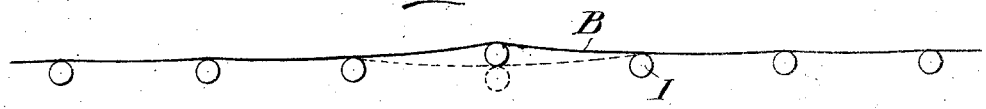
Fig. 13.
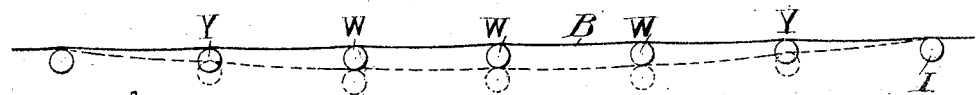
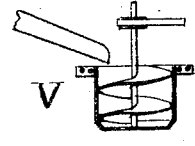
Fig. 14.
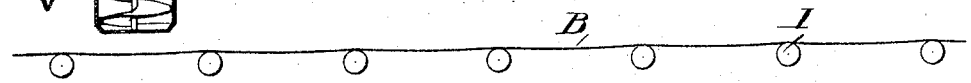
Inventor
Samuel D Kinne
by Howard A. Coombe
his attorney
Witnesses
A. Goodford
T. Kearns

UNITED STATES PATENT OFFICE.

SAMUEL D. KINNE, OF ANN ARBOR, MICHIGAN, ASSIGNOR, BY MESNE ASSIGNMENTS, TO THE CONVEYING WEIGHER COMPANY, OF NEW YORK, N. Y., A CORPORATION OF NEW YORK.

WEIGHING-MACHINE.

1,074,123.  Specification of Letters Patent.  Patented Sept. 30, 1913.

Application filed October 28, 1903. Serial No. 178,882.

*To all whom it may concern:*

Be it known that I, SAMUEL D. KINNE, a citizen of the United States, residing at Ann Arbor, in the county of Washtenaw and State of Michigan, have invented new and useful Improvements in Weighing-Machines, of which the following is a specification.

This invention relates to weighing machines, and has for its object the production of a continuously operated machine of simple construction by means of which the weight of materials transported by conveyers may be measured and registered while being transported.

It is a desideratum of importance in handling large quantities of materials by means of conveyers, as in the piling of coal in storage and the recovery of the same from storage or in the handling of other materials in large quantities, to have means connected directly with the conveying apparatus and continuously operated thereby to weigh the material handled while in transit on the conveyer.

Various forms of apparatus have been used to weigh materials handled by conveyers either before being fed to the conveyer or after having been discharged from the conveyer. The weighing devices commonly employed with conveyers are known to the trade as "weighing hoppers," and they are open to various objections, among which may be mentioned heavy cost, inaccuracy, want of durability and inconvenience in use in many cases where weighing devices are extremely desirable.

The present invention is designed to take place of the devices mentioned and to perform their function in a more satisfactory manner.

Every embodiment of the invention as hereinafter fully described consists, generally speaking, of a simple form of apparatus adapted for use in connection with a belt conveyer of any of the ordinary types to register the weight of the material which passes over the conveyer belt so as to show at any time just how much material has been carried by the belt. The principles of the invention may, however, be embodied in apparatus adapted for use with conveyers of other types.

In describing the invention, reference will be had to the accompanying drawings, in which are illustrated several different forms of embodiment of the invention, each capable of carrying the same into practical operation.

In the drawings: Figure 1 is a view in front elevation of one form of the weighing machine. Fig. 2 is a view looking from the side of the apparatus shown in Fig. 1. Fig. 3 is a sectional view on the line 3—3 of Fig. 1. Fig. 4 is a view showing the arrangement of the operating shaft of the weighing machine with a set of idlers somewhat different from those shown in Fig. 1. Fig. 5 is a view in elevation of a modified form of the invention. Fig. 6 is a view from the side of the structure shown in Fig. 5. Fig. 7 is a plan view of the apparatus shown in Fig. 5. Fig. 8 is a view of a modified form of driving mechanism for the registering apparatus. Fig. 9 is a detail view from Fig. 8. Figs. 10, 11, 12, 13, and 14 are diagrams illustrating the operation of the invention.

Referring to the drawings, in which corresponding parts are designated by the same reference characters, 1 designates a bed of planking supported on longitudinal side beams 2—2 which form a support for the shaft 3 upon which are mounted the belt-return pulleys 4, the shaft 3 being rotatably mounted in suitable bearing blocks 5. Upon the upper side of the bed 1, upon which are mounted the idlers upon which the conveying belt is supported, there is mounted an arched frame 6 comprising the vertical side portions 7 which are channeled on the inner faces, as shown in Fig. 3, and the curved top 8 which is provided in the middle with an opening for the passage of a rod 9 carrying an idler-supporting frame 10. The frame 10 consists of vertical side portions 11 which fit within the channels of the side portions 7 of the frame 6, as shown in Fig. 3, and a top portion 12 comprising the horizontal part to which the rod 9 is secured and inclined portions at the sides thereof leading to the vertical side portions. In the frame 10, which is mounted for vertical movement within the channeled sides of the frame 6, are supported the shaft sections 13, 14 and 15, upon which are journaled idler pulleys 16, 17 and 18. The principal support for the shaft sections 13, 14 and 15 is afforded by the transverse bar 19 which connects the vertical frame members 11 at the bottom and has extending upward therefrom the uprights 20 upon the upper ends of which are formed bearing blocks 21 to receive the ends of the shaft 14 and the inner ends of the shafts 13 and 15.

The frame 10 is supported within the frame 6 in the position shown in Fig. 1 by means of a spring 22, which encircles the rod 9 and is secured in position by means of a nut 23 upon the threaded upper end of the stem. The rod 9 will be made of any suitable length to provide for the compression of the spring when the frame 6 is depressed, but in order to save space in illustration, both the rod and spring are shown as broken intermediate of their ends.

Journaled in the side members 11 of the frame 10 and extending through a slot 6ª in one of the side members of the frame 6 is a shaft 24 which bears a small roll 25 arranged for contact with the under surface of the idler 16, and in order to insure continuous contact of roll 25 and idler 16, there are preferably provided in the standards 20 springs 26, supporting at their tops semicircular bearing blocks 27, which are pressed against the under side of shaft 24. Also mounted on the frame 10 at one side thereof and projecting through the slot 6ª is a supporting arm 28, which affords a bearing for a short shaft 29 having rigidly secured to its lower end a cone 30. The cone 30 and the shaft 29 are so arranged that on the outer side of the cone its surface lies tangent to a vertical plane.

In the construction of the apparatus it is desirable to minimize friction in the bearings and to that end anti-friction bearings of recognized type should be employed wherever possible. As the type of bearings to be employed is a matter of choice, and will be readily determined by any one skilled in machine construction and design, it is deemed unnecessary to illustrate any special type of bearings or to indicate the location of anti-friction bearings in the apparatus.

In order to impart movement to the cone 30 at a speed proportional to that of the belt which travels over pulleys 13, 14 and 15, a small bevel pinion 34 is mounted on the end of shaft 24 and a bevel gear to intermesh therewith is formed on the base of the cone 30, as indicated at 35.

Projecting horizontally outward from the vertical member 7 of the frame 6 adjacent to the cone 30 is a shelf 37 having upturned edges 38 forming ways in which a casing 39 is mounted for horizontal movement. The casing 39 contains any suitable form of registering apparatus, preferably one adapted to be set back to zero when desired and provided with dials, as shown in Fig. 2 for registering in tons the quantity of material carried over the belt. Projecting downward from the casing 39 is a bracket arm 40 in the lower end of which is formed a socket 41 within which is journaled the lower end of the vertical shaft 42 by means of which the registering mechanism in the casing 39 is actuated. The shaft 42 is provided near its lower end with a small roll 43 presenting a narrow periphery which may be brought into and out of contact with the cone 30 by turning a thumb nut 44 upon the threaded end of a member 45, which projects from a block 46 under shelf 37 and has an enlargement 45ª in which a slot 45ᵇ is made for the passage of shaft 42. The member 45 also bears a compression spring 47 which presses against the upper part of the bracket arm and tends to force the casing 39 and the bracket arm with the structure supported thereby outward from the frame 6.

In Figs. 1 and 2 the members of the apparatus are shown in the position occupied when no material is being carried by the belt and the roll 43 lies just below the apex of the cone 30, so that if the belt be set in motion movement will be imparted to the pulley 14 and to the mechanism operatively connected therewith, but will not impart movement to the roll 43 and the shaft 42 upon which it is rigidly secured. Consequently, the hands which are shown in front of the dials of the registering mechanism will not move, but as soon as any material is placed upon the belt, the frame 10 will be forced downward against the tension of spring 22 and the cone 30 will move downward with the frame, causing its outer surface to come into contact with the periphery of the roll 43. The rotation of the cone will impart movement to the roll 43 and the shaft 42, so setting in motion the registering mechanism in the casing 39 and causing the movement of the hands over the dials at a rate proportional to the speed of rotation of the cone and to the distance from the apex of the cone to the point of contact of the roll 45 with the outer surface of the cone. As the roll 25 is kept constantly in contact with the idler 14, the shaft 24 will always be rotated at a speed proportional to the rate of travel of the belt, and by means of the bevel gearing connecting the shaft 24 and the cone 30, the rotation of the cone 30 will be kept proportional to that of the shaft 24. Consequently, the shaft 42 which is driven by the contact of the roll 43 with the cone 30 will be driven at a speed which will vary with the rate of travel of the belt and with the amount of depression of the cone 30, for the circumference of the cone at any point is in direct proportion to the distance of that point from the apex. Inasmuch as the cone 30 is mounted upon an arm projecting from the frame 10, in which the belt supporting idlers are mounted, the depression of the cone will obviously be equal to the depression of the frame 10, and as the frame 10 is supported by means of the spiral spring 22 the depression of the frame with the increase of weight upon the belt will be approximately proportional to the weight of the material on the belt adjacent to the idlers.

In Fig. 4, there is shown a modified set of supporting idlers for a conveyer belt which may be used in lieu of the idlers already described. In this modification of the invention, the idler pulleys, consisting of a middle pulley 51 and side pulleys 52 and 53 of tapering form, are supported upon a single shaft 53 which is to be journaled in the arched frame 10. The roll 25 on the shaft 24 is replaced by a roll 25ª necessarily much larger than the roll 25 in order to come into contact with the middle idler pulley 51. The connection of the shaft 24 with the registering mechanism, when bearing the roll 25ª will not differ from that already described.

In the modified form of the invention shown in Figs. 5, 6 and 7, the structure is especially adapted for use in situations in which a machine of the type illustrated in Figs. 1 and 2 could not be employed on account of the height thereof. In this modified form of the invention the arched frame 6 is replaced by a pair of channeled uprights or standards 60, 61, the latter of which has a slot at its outer side. The idler pulleys, comprising a horizontal pulley 62 and a pair of inclined pulleys 63, 64 arranged in a plane parallel to that of the middle pulley, are all supported in upright supporting members 65 rising from a horizontal plate 66 having upturned guide lugs 67 at the sides arranged for sliding movement within the channeled uprights 60, 61. Journaled in the guide lugs 67 and having one end projecting through the slot in the standard 61, is a shaft 68 having secured thereon about midway between the lugs 67 a small roll 69 which is in frictional contact with the middle idler pulley 62. At the end of the shaft 68 which projects through standard 61 is a friction disk 70 having at the center a small depression 71. A bracket 72 is mounted on the outside of standard 61 at the top and this bracket has the edges of its horizontal arm 73 turned up to form a channel in which a registering device of the character already described is supported. The small roll 43 on the actuating shaft 42 is in this form of the device normally at the center of the disk 70 where the depression 71 will prevent contact of the roll with the surface of the disk. The depression 71 serves to prevent wear upon the roll 43 when the belt is traveling over the idlers without a load. If the disk 70 had no depression the rotation of the disk when the belt had no load thereon would soon produce flattened surfaces upon the roll and prevent accurate registration. The plate 66 is yieldably supported by means of a spring 75 resting in a cup 76 on the end of a screw 77 in the bed 1. The upper end of the spring 75 is engaged by a stud 78 on the underside of the plate 66 to prevent the slipping of the spring from its proper position.

In Fig. 8 there is illustrated another modified form of embodiment of the invention in which the cone 30 is replaced by a cone 80 whose surface is generated by the revolution of a curved element and is flared toward the base. In lieu of the spring used in the form of the invention first described to force the registering mechanism away from the frame, a coil spring 81 is arranged outside of the bracket arm 40 on the arm 45 to force the registering mechanism inward toward the frame 6. The inward movement of the registering mechanism is limited by contact of the arm 40 with shoulders 45ª on the member 45 which is slotted at 45ᵇ for the passage of the shaft 42.

The general principle of operation of the several different forms of embodiment of the invention described in the foregoing paragraphs is the same, and, briefly stated, the principle of operation of the several forms is that the amount of material which passes over the weighing device will be shown by the registering mechanism if operated at a rate proportional both to the rate of travel of the belt and the depression of the idlers upon which the belt is supported. If the amount of depression of the belt were at all times directly proportional to the weight of the material thereon the registering apparatus would always show exactly how much material had been carried in a given period, but this condition is seldom realized in actual practice for a variety of reasons which will be hereinafter explained in detail.

The first factor in the production of inaccuracy in the operation of the apparatus which must be provided for is the variation of the speed of the belt as it passes over the idlers. It will be obvious that, if the belt is traveling at a rapid rate, the momentum in a horizontal plane of the material on the belt will prevent the depression of the idlers to the same extent that they would be depressed if the belt were going slowly. Consequently, in arranging the mechanism for driving the registering apparatus, it must be assumed that the belt is to travel at a certain standard speed which may, for example, be three hundred feet per minute, and the registering mechanism arranged to give accurate results with a belt having such a speed. If the rate of travel of the belt is not quite uniform, but the average speed is that for which the apparatus is set, the effect upon the registering apparatus will be practically the same as if a constant speed at the desired rate were maintained, and variations in the speed may then be neglected.

If the weighing mechanism is to be used with a belt whose average speed will be greater or less than the standard, the registering mechanism need not be changed, but the registration produced in the operation of the belt may be multiplied by an empirically determined constant in order to obtain the correct figures for the rate at which the belt has been traveling, and it will be desirable to determine empirically a table of constants to be used for multiplying the registrations of a standard apparatus when used with belts traveling at other speeds than the standard.

It is, of course, desirable that the belt shall travel in a direction that is as nearly horizontal as possible so that the full effect of the weight of the materials carried by the belt may be produced on the weighing apparatus, but if it is impracticable to have any portion of the belt travel in a horizontal plane, the registration obtained from a weighing mechanism over which the belt travels in an inclined plane may be multiplied by a constant which will be determined by the angle of the plane of travel of the belt to the horizontal.

Another important factor in the production of an accurate registration of the total weight carried by the belt is the uniform feed of material to the belt so that the material carried may be evenly distributed along the belt and all the parts of the belt be kept under substantially the same tension during the operation of the weighing mechanism. With many materials carried upon conveyer belts it is easy to insure uniformity in the feed of material to the belt, and when this is the case the action of the weighing mechanism will be most accurate. A simple means for effecting such uniformity of feed is illustrated diagrammatically in Fig. 14 and is of the type known as a screw vane feeder, by means of which the material fed to the belt is uniformly distributed by means of a screw driven at a constant rate of speed and operated in a casing of circular cross-section. But under some circumstances it is practically impossible to secure even approximate uniformity of feed, and sometimes some sections of the belt will be entirely bare and other portions heaped up with material. As a result of this condition the belt is not kept under uniform tension and the difficulty of obtaining an accurate measurement of the amount of material carried is increased. In such cases the best mode of procedure will be to employ a plurality of weighing mechanisms, as indicated in Fig. 13, in which W, W, W indicate diagrammatically three separate weighing mechanisms and Y, Y, represent yieldably supported idlers, without weighing mechanism, arranged on either side of the set of weighing mechanisms. With a belt supported in this way the average reading of the three registers may be taken and the result obtained in that manner will give a close approximation to the correct figures.

Another factor which interferes with the accuracy of the registration under ordinary conditions is that, as the idlers of the weighing mechanism are depressed the tension of the belt is necessarily increased, and consequently an added increment of material after the idlers of the weighing mechanism have already been somewhat depressed will not be productive of so great an effect in the further depression of the idlers as it would have had if the same additional weight had been placed upon an unloaded belt passing over idlers that had not been depressed. A way in which this may be compensated for is illustrated in Figs. 10, 11 and 12. Fig. 10 is a diagrammatic view showing a belt B traveling over ordinary idlers I, and showing the sag which always occurs between idlers mounted in fixed supports and due to the flexibility of the belt. In Fig. 11, one of the ordinary idlers I is replaced by a weighing mechanism and the increased sag of the belt at the weighing mechanism W when the belt is loaded is indicated in dotted lines. Now, it will easily be seen that when the belt is depressed to the dotted line position shown in Fig. 11, additional weight supplied to the belt over the weighing mechanism W will have to stretch the belt before depressing the weighing mechanism. In order to eliminate this factor and obtain the full effect of the weight in depressing the weighing mechanism, the belt may be supported normally in the position shown in solid lines in Fig. 12, so that the upper surface of the idlers of the mechanism will be above the plane of the upper surface of the ordinary supporting idlers, this being the position occupied by the weighing idlers when the belt is free of any load. Then, any load placed on the belt will act with perfect freedom upon the weighing mechanism, because the depression of the weighing idlers will be accompanied by no increase of tension in the belt. On the contrary, the depression of the weighing idlers by the passage of material over them decreases slightly the tension of the belt, and this decrease in tension tends to vitiate the accuracy of the registration. The effect, however, of the decrease in tension is slight, and if, as may be easily done, the spring supporting the weighing idlers be so adjusted that the position to which the weighing idlers will be depressed by the average load carried by the belt is as much below the level of the supporting idlers as the normal position of the weighing idlers when the belt is running empty is above the supporting idlers the vitiating effect of this decrease in tension of the belt will be obviated.

It is possible to compensate for any increase in tension upon the belt when loaded without arranging the weighing mechanism as shown in Fig. 12, and the mechanism shown in Figs. 8 and 9 is designed for this purpose. The cone 80 shown in Fig. 8 and having a flare toward the base is adapted for this purpose. Owing to the flare of the cone, the depression of the cone for the first half inch from the position occupied when the belt is running empty will have less effect upon the registering mechanism than the depression for a half inch after the cone has already been depressed to some extent, and by experiments with belts of different kinds the proper flare of the cone for a belt of given dimensions may be easily determined so that the increased effect upon the operation of the registering mechanism due to the depression of the cone through a predetermined space after the belt is loaded may exactly counterbalance the lessened depressing effect of an added increment of weight after the belt is already loaded.

In the foregoing explanation of the principles of operation of the weighing mechanism, mention has not been made of the fact that it is to be assumed that the unloaded belt is presumed to be kept at a predetermined tension. This is the ordinary procedure in operating conveyer belts and practically all belt conveyers are provided with take-ups by means of which the tension of the belt when unloaded may be kept constant. In order that small variations in the tension of the unloaded belt may be quickly noted and corrected, it will be desirable to provide in connection with the ordinary take-up devices a dynamometer to indicate the degree of tension of the belt, but this forms no part of the present invention, and hence has not been illustrated.

In the foregoing paragraphs explaining the factors to be taken account of in the weighing of materials while in transit on a conveyer, only the more important factors have been mentioned, as absolute accuracy in determining the weight of the material carried by conveyers is not essential. Materials handled by conveyers are dealt with in such large quantities that small inaccuracies are of no moment and do not lessen the utility of the apparatus.

Moreover, one of the principal objects of the present invention is to make the weighing mechanism both simple and durable and adapt it for practical use under the conditions under which it must necessarily operate. Consequently, the aim has been to so construct and arrange the mechanism that large errors will be prevented and the small errors that are unavoidable be of such character that the registrations in excess of the actual weight carried will balance the registrations that are below the actual weight carried, so that the total obtained will be substantially correct.

While the preferred forms of embodiment of the invention have been illustrated and described, it is to be understood that I do not desire to limit myself to the exact form, proportions and mode of arrangement of the elements, but reserve the right to make such changes therein as do not depart from the spirit of the invention and lie within the scope of the appended claims.

It is also to be understood that the mechanism by which the registering devices are operated bears no relation to the form of idlers in which it is shown, and the friction disk-drive, shown in Figs. 5, 6, and 7 may be interchanged with the cone and roller drive shown in Figs. 1, 2 and 3 or with the modified cone and rollers shown in Fig. 8.

Having thus described my invention, what I claim as new and desire to secure by Letters Patent is:

1. The combination in a weighing machine of a conveyer belt, yieldably supported idle pulleys upon which said belt is carried, a yieldably supported rotatable shaft driven by one of said idle pulleys, a registering mechanism, and connections between said shaft and said registering mechanism whereby said registering mechanism is operated at a rate proportional to the rate of rotation of said shaft, and the amount of its depression from its normal position.

2. The combination in a weighing machine of a conveyer belt, a frame, idle pulleys mounted in said frame over which said belt travels, a spring which supports said frame, a registering mechanism, and driving devices for said registering mechanism arranged between said registering mechanism and one of said idle pulleys, said driving mechanism being adapted to operate said registering mechanism at a rate proportional to the rate of rotation of the idle pulleys and to their depression.

3. The combination in a weighing machine of a conveyer belt, a yieldably supported frame, idle pulleys mounted on said frame over which said belt travels, a shaft rotatably mounted in said frame and driven by one of said pulleys, a registering mechanism, and driving mechanism for said registering mechanism operated by said shaft at a rate proportional to the rate of rotation of a rate and to the depression of the frame in which the shaft is mounted.

4. The combination in a weighing machine of a conveyer belt, a frame, idle pulleys mounted in said frame over which said belt travels, a spring to support said frame, means for adjusting the position of said frame relative to said spring, a registering mechanism and driving mechanism operated by one of said idle pulleys at a rate proportional to the rate of travel of the belt and the depression of the frame in which the idle pulleys are mounted.

5. The combination in a weighing machine of a conveyer belt, yieldably supported idle pulleys over which said conveyer belt travels, a registering mechanism, driving connection between one of said idle pulleys and said registering mechanism to operate said registering mechanism at a rate proportional to the rate of travel of said belt and the depression of said idle pulleys, and means for moving said registering mechanism to break the driving connection between said idle pulley and the registering mechanism.

In testimony whereof I have signed my name to this specification in the presence of two subscribing witnesses.

SAMUEL D. KINNE.

Witnesses:
D. C. GOODSPEED,
T. KEARNS.